May 16, 1961
R. ANTONSEN
2,984,547
TREATMENT OF FINELY DIVIDED PIGMENTS
Filed Oct. 26, 1956
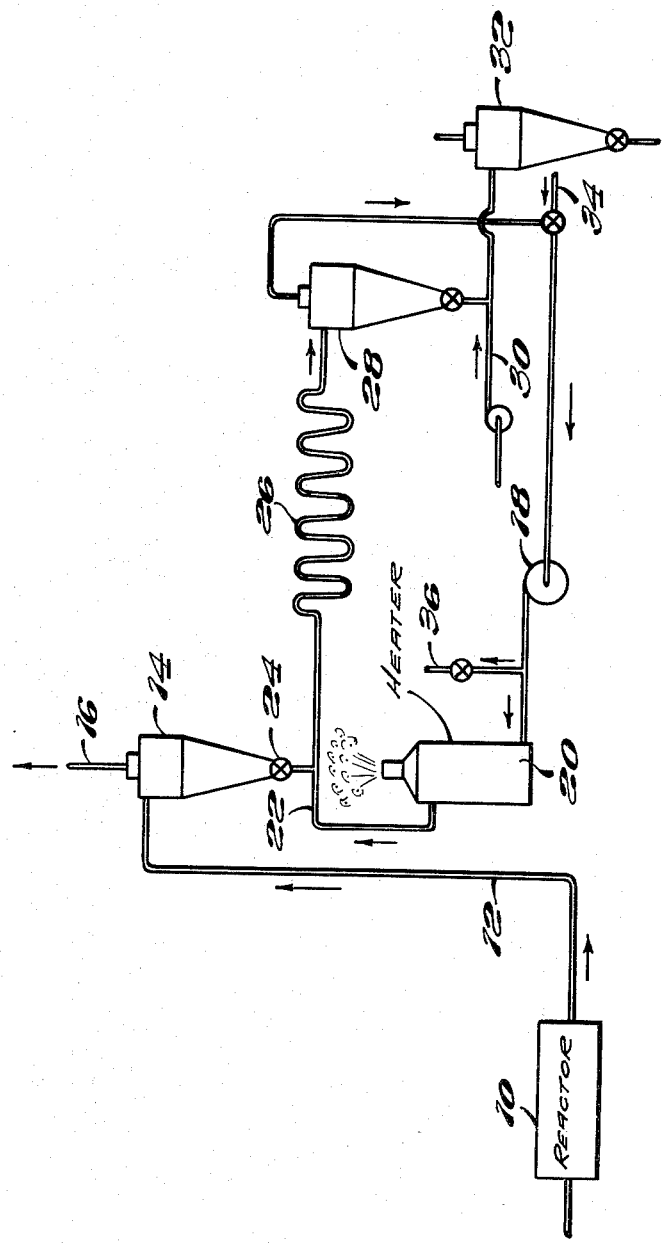
INVENTOR.
RANDOLPH ANTONSEN
BY 2,984,547
Patented May 16, 1961

2,984,547
TREATMENT OF FINELY DIVIDED PIGMENTS

Randolph Antonsen, Boston, Mass., assignor to Cabot Corporation, Boston, Mass., a corporation of Delaware Filed Oct. 26, 1956, Ser. No. 618,548

9 Claims. (Cl. 23—209.1)

This invention relates to the treatment of finely-divided pigments primarily to alter their surface characteristics. More particularly it relates to the aftertreatment of carbon blacks produced from normally liquid hydrocarbons in a furnace to improve their performance in rubber, ink and the like.

It is now well established that many pigments, notably carbon blacks, can be beneficiated in one way or another by treating them at elevated temperatures in the presence of gaseous oxygen. The result of such treatment is, of course, to add carbon-oxygen complexes to a greater or lesser extent to the carbon black surface, which in turn effects a reduction in pH of the carbon black. Such surface oxidation can be carried out with both channel and furnace blacks but it is particularly advantageous when performed on the so-called oil furnace blacks.

In U.S. Patent No. 2,682,448 of Cines the accomplishment of a controlled oxidizing treatment of furnace oil carbon black simultaneously with the pelletization thereof is suggested. In the process of said patent a gas containing 2.5 to 10% by volume oxygen heated to 650–1000° F. is passed through a pelletizing drum so that the carbon black is within the space of an hour or two converted to pellets characterized by a pH of 7 or less. The trouble with this process is that the only possible product is a pellet and, owing to the vagaries of gas passage over a deep bed of carbon black and the relative inaccessibility of a large part of the black, the treatment is very slow and uneven, resulting in a non-homogeneous product. Moreover, because of the low activity of the black during the pelletizing operation, excessively large quantities of treating gases must be handled, resulting in an inefficient and expensive operation.

It is the principal object of this invention to provide an improved process for effecting oxidative aftertreatment of a fine pigment, such as carbon black, while in the fluffy state. It is a further object of this invention to provide a novel process in which a fine pigment can be conveyed from the furnace in which it has been produced and subjected to a controlled oxidizing treatment while the surfaces of said pigment are still fresh and active and then recovered as product still in the loose non-pelleted state.

The process of this invention is carried out by conducting the carbon black or other finely divided solid pigment from the producing furnaces in aerosol form and, after concentration by separation of the solid phase of said aerosol, subjecting said finely divided pigment while being conveyed in aerosol form to intimate contact with hot gaseous oxygen. In order to minimize the size of the equipment required for said treating step, the solid pigment is concentrated by separating it from the gas phase of the initial aerosol leaving the producing furnace, using e.g. cyclones or other suitable fine solids collecting equipment, and then resuspended as an aerosol of relatively high concentration, i.e., about 30 to about 700 grains per cu. ft. in the treating gas. In this system the collected carbon black, or other pigment, while still in the fluffy state, is discharged from the primary collection system through a substantially gastight metering valve into a stream of hot conveying gas containing molecular oxygen. In order to minimize the amount of carbon gasified by conversion to gaseous oxides when carbon black is the pigment, the concentration of oxygen in the gas stream should be carefully restricted—generally to less than 10% by volume, particularly when the temperature of the treating gases is above about 800° F. It has been found that most accurate control of the degree of aftertreatment of the black is obtained by using temperatures in this range and particularly between 1000° and 1200° F. In such temperature ranges, for a given degree of aftertreatment the concentration of the oxygen in the treating gases should be adjusted in proportion to the concentration at which the black is to be suspended therein. Under such conditions very careful control of the operation can be obtained and an extremely uniform product can be made in a treating zone affording a total exposure time of not more than a very few minutes and, at the higher temperatures, only a matter of seconds. This, of course, is one of the outstanding advantages of the present invention. In any case, the amount of carbon black or other pigment discharged into the treating gas is adjusted in proportion to the amount of said gas so that substantially all of said pigment is suspended in the hot oxygen-containing gas as a concentrated aerosol and maintained in suspension in this gas for a sufficient period of time to accomplish the desired extent of treatment. Thereafter the treated carbon black is recovered as product in another set of collecting equipment. The gaseous constituent of the aerosol may be recycled in whole or in part to suspend and carry the carbon black, make-up air or oxygen being added to the gas stream in the quantity required.

It will be appreciated that the process of this invention has several advantages over that of the above cited Cines patent. For one thing the carbon black, or other pigment, will be uniformly aftertreated since each individual particle will be exposed to the hot oxidizing gas to the same extent and for the same period of time as any other particle. Furthermore, the pigment will be completely treated much more rapidly than would be possible if the black were in pellet form since obviously the penetration of gas into the interstices of the pellets is a relatively slow and erratic operation. Also, the degree of aftertreatment is subject to much more careful control and is achieved with much greater convenience and at lesser expense. Finally the treated carbon black is recovered in the fluffy state and may be packaged in that state or further agglomerated, even to the pellet state.

It should be borne in mind that carbon black treated according to my invention may also be used as a pigment in ink, for which use ordinary pelletized black is usually not practicable. Consequently, not only will carbon black treated in accordance with this invention have a longer cure time and hence be less scorchy in rubber but it also will be an improved ink pigment having longer flow and greater tinting power.

The invention will now be described in conjunction with the accompanying drawing which is a flow diagram of a preferred embodiment of my process.

Carbon black from furnace 10 after being quenched in usual fashion is conducted in furnace tail gases through conduit 12 to separator 14 which may consist of one or more cyclones and/or other conventional collection equipment. At this point it should be understood that there will be a plurality of furnaces supplying effluent to conduit 12 and there may be a plurality of cyclones 14 plus electrostatic precipitator and bag filter to effect substantially complete collection of the carbon black. The effluent 16 from separator 14 can be reused as a conveying gas either in other parts of the carbon black plant or in various parts of the present system such as in line 30 which is described later herein.

Hot treating gas, which may be oxygen enriched furnace tail gas containing about 1 to 10% by volume oxygen preferably introduced in the form of air, is forced by means of fan 18 through heater 20 into treating conduit 22. The temperature of this gas stream should be raised to a value of between about 600 and about 1200° F. in passing through the heater 20. As the hot treating gas in conduit 22 passes beneath separator 14 it is supplied with fluffy carbon black through rotary valve 24 in the proportion of about 50 to about 500 grains of black per cu. ft. of treating gas. The carbon black thus suspended in the hot gases is then conducted in aerosol form through serpentine section 26 and is eventually separated from the gas in separator 28. It will be understood that serpentine section 26 may be replaced by a holdup tank, a fluid bed arrangement and the like, the same being adapted to provide contact time between carbon black and hot treating gas without an excessively long treating conduit 22.

The carbon black recovered in separator 28 is the treated product of this invention. However, in order to reduce the temperature of the black sufficiently for safe storage, packaging or for further handling, it is usually advantageous to convey the black in a cool gas stream in conduit 30 and recollect it at a lower temperature in separator 32.

As illustrated the treating gas is preferably recycled through fan 18, heater 20, etc., make-up air or oxygen being added as needed to the system through pipe 34. If the oxygen is added in an impure form, e.g. as air, excess gases can be bled from the system through line 36. It will be obvious, however, that instead of always recycling the treating gas, some of the effluent from separator 14 may be passed through fan 18, heater 20, etc. and, with the addition of air or oxygen as before, can be used as the conveying treating gas. Likewise any insert gas such as $N_2$, $CO_2$, argon, etc. can, with the addition of 1 to 10% by volume of $O_2$ serve as the conveying treating gas in the above system.

The following is a specific example of the operation and performance obtainable by the practice of this invention.

*Example 1*

It is desired to add sufficient volatile matter to an oil furnace carbon black having a normal pH of about 9 to 10 to reduce its pH to about 7 to 8 with less expenditure of time and effort than is required by conventional aftertreatment methods.

Instead of treating a bed of the black in a rotating drum with a hot stream of free-oxygen containing gas, a process requiring at least a matter of hours and resulting in a heterogeneous or non-uniform product, the following process based on the instant invention is tried.

The fluffy black is conveyed by means of gas transport from the several cyclones and bag filters in which it is first collected and conveyed to a common cyclone where it is recollected and drops into a common feeding hopper. From this hopper it is metered into the treating system where it is picked up in a stream of gases heated to about 1000° F. and containing about 2% molecular oxygen by volume, the remainder of the stream consisting largely of nitrogen and oxides of carbon. The resulting suspension containing about 100 grains of black per cubic foot flows in aerosol form through an insulated duct work of such length as to require about one minute total passage time from beginning to end. At the end of this duct work the black is recollected in a cyclone and the separated gas stream is recycled by means of a fan through a heater and back to the common feeding hopper to pick up more untreated black. Along the way sufficient oxygen is introduced to restore the original concentration of the stream to about 2% by volume.

The treated black recovered as product is found to have a pH of about 7.5 and contain about 3% volatile matter by weight compared to 1% volatile matter by weight on the original untreated material.

The treated black showed excellent reinforcing characteristics when used in rubber batches at loadings up to 40 to 50 parts of black per 100 parts of rubber with no indication of scorching difficulties such as were encountered with the original untreated black.

In the above example, equally good results can be obtained with a more concentrated aersol containing about 200 grains/cu. ft. provided the initial concentration of molecular oxygen in the suspending gases is increased to about 4% by volume.

Likewise in the above arrangements the treating gas can be heated to any temperature between about 800 and 1200° F. instead of about 1000° F. as stated above.

Having described my invention and preferred embodiments thereof, what I claim and desire to secured by U.S. Letters Patent is:

1. A process for increasing the volatile content of oil furnace carbon black which comprises concentrating the fluffy carbon black by separating it from the furnace effluent, promptly resuspending the concentrated fluffy black as a reconstituted aerosol of higher concentration than the oil furnace carbon black effluent in a hot gas stream containing 1 to 10% by volume molecular oxygen, conveying the hot aerosol through a confined zone at a temperature and for a period of time sufficient to increase the volatile content of the black appreciably, and recovering the treated black in fluffy condition.

2. The process of claim 1 in which the aerosol gas stream is within a temperature range of from about 600° F. to about 1200° F.

3. The process of claim 1 in which the aerosol gas stream is at a temperature of from about 1000° F. to about 1200° F.

4. The process of claim 1 in which the reconstituted aerosol has a carbon black grain loading of about 30–700 grains per cu. ft.

5. In a process for increasing the volatile content of oil furnace carbon black, the improvement which comprises concentrating the fluffy carbon black by separation from the furnace tail gases, then promptly suspending said carbon black as an aerosol in a hot gas stream containing about 1 to 10% by volume molecular oxygen, at a temperature and for a period of time sufficient to increase the volatile content thereof appreciably.

6. A process for treating oil furnace carbon black which comprises suspending in aerosol form in a hot gas stream containing 1 to 10% by volume of molecular oxygen freshly made carbon black while still in the fluffy state and before it has been exposed to any other treatment than the conventional concentration by separation from furnace effluent gases in the dry fluffy state, conveying the resulting hot aerosol or carbon black suspension at a reactive temperature through an enclosed treating zone of sufficient size to accomplish the desired increase in volatile content of the black, and then collecting the treated black still in the dry fluffy state.

7. The process of claim 6 in which the black is first withdrawn from the furnace tail gases by means of a cyclone separator and is then promptly suspended in dry fluffy form in a gas stream having a temperature of from about 600° F. to about 1200° F. and containing about 1 to 10% by volume of molecular oxygen to form a relatively concentrated but stable aerosol or carbon black suspension containing from about 30 to about 700 grains of carbon black per cubic foot.

8. A process for treating oil furnace carbon black which comprises suspending in a gas stream having a temperature of about 800 to about 1200° F. and containing about 1 to 10% molecular oxygen by volume and no other components normally reactive with oxygen at temperatures below 1200° F. freshly produced carbon black in the dry fluffy state in which it is normally collected upon separation in a cyclone from the furnace tail gases so as to form a relatively stable and concentrated aerosol or carbon black suspension containing about 50 to about 500 grains of carbon black per cu. ft., conveying the resultant hot aerosol through an enclosed treating zone of sufficient size to accomplish the desired reaction between carbon black and oxygen, thereby adding the required amount of volatile matter to the carbon black, collecting the treated black still in the dry fluffy state, and recycling the gases separated therefrom for reuse in treating more black after restitution of the oxygen content and temperature level to the levels specified above.

9. The process of claim 8 in which the temperature of the gas stream in which the black is suspended is not greater than 1200° F. its oxygen content is only about 2%, and the concentration of black in the resultant aerosol is approximately 100 grains per cubic foot.

References Cited in the file of this patent

UNITED STATES PATENTS

| | | |
|---|---|---|
| 2,198,560 | Marshall | Apr. 23, 1940 |
| 2,641,535 | Cines | June 9, 1953 |
| 2,682,448 | Cines | June 29, 1954 |
| 2,707,672 | Sweitzer | May 3, 1955 |
| 2,771,158 | Bray et al. | Nov. 20, 1956 |
| 2,779,664 | Sweitzer | Jan. 29, 1957 |
| 2,788,267 | Larson et al. | Apr. 9, 1957 |